May 1, 1956  W. S. MOORE  2,744,175
ELECTRICAL SAFETY SWITCHES
Filed March 10, 1953  2 Sheets-Sheet 1

William Stirling Moore INVENTOR.

BY
Wood, Herron & Evans

May 1, 1956 W. S. MOORE 2,744,175
ELECTRICAL SAFETY SWITCHES
Filed March 10, 1953 2 Sheets-Sheet 2

William Stirling Moore INVENTOR.

BY

2,744,175
Patented May 1, 1956

2,744,175

ELECTRICAL SAFETY SWITCHES

William Stirling Moore, Batavia, Ohio

Application March 10, 1953, Serial No. 341,447

11 Claims. (Cl. 200—61.47)

This invention relates to a switch of the type which utilizes a pool of mercury to complete an electrical circuit, and is addressed in particular to an improved structure of this general character providing an automatic safety switch for automotive vehicles which is arranged to open the electrical circuits should the vehicle be involved in an accident.

The principles o fthe invention are also applied to control switches for household or industrial electrical circuits or to overload switches in place of the usual replaceable fuse.

In its utility as a safety switch for vehicles, the devide is intended to be installed in passenger cars and commercial vehicles such as trucks and semi-trailers which are powered by gasoline engines having electrical ignition and lighting systems. The safety switch is inserted in the electrical circuit and is adapted to deenergize the entire electrical system, both ignition and low tension, in the event that the vehicle is involved in a crash, either a collision in the direction of travel or one which causes the vehicle to overturn or roll over.

Many highway accidents involving the loss of life, injury to the passengers or destruction of property can be traced to fires which are started by the electrical system or equipment of the vehicle. The fire hazard is a serious one since the engine or other parts of the vehicle, due to impact forces, are often drenched with gasoline from the tank or from broken gasoline lines and fuel accessories. If the engine continues running after the accident, the spilled gasoline is very likely to be ignited by electrical sparks generated by the high tension ignition system. Fires are caused by sparks and heat from short circuits in the low voltage or storage battery circuits, such short circuits being caused by damage to the wiring or other electrical components. It will be understood therefore, that if the battery or low tension circuit and the high tension ignition circuit are both broken automatically when an accident occurs, then the chance of an electrically started fire is eliminated.

Safety switches of this general nature have been proposed in the past and have usually been inserted in the main storage battery circuit of the vehicle, the purpose being to deenergize the entire electrical system if the vehicle is involved in an accident. However, most electrical systems includes a generator which is connected in the circuit in such manner that the generator, if running, will supply electrical energy to the ignition system and thereby keep the engine running even though the battery is disconnected by operation of the safety switch.

It will be understood therefore, that in order to deenergize the entire electrical system, it is necessary to interrupt both the battery circuit and generator circuit at the time of the crash. This provides complete protection against fires which are caused by the electrical system whether or not the engine is running at the time of the crash.

One of the primary objects of the present invention therefore, has been to provide a mercury switch having several contacts in common electrical connection with a single pool of mercury and arranged to deenergize the storage battery or low tension circuit and also the generator circuit should an accident occur.

Another object has been to provide a safety switch of the mercury type, which may be reset or closed in a convenient manner by rotating the switch bodily about its horizontal axis after having been tripped to open position.

Briefly, in its utility as a vehicle safety device, the switch is opened automatically either by impact forces or by gravity acting upon the mercury pool, depending upon the type of accident which may befall the vehicle. On the other hand, in its utility as an overload switch in stationary circuits, the mercury is displaced by electrical energy as distinguished from physical forces. In either of its uses, the switch embodies the same principles and structural features and is reset simply by rotating it bodily about its horizontal axis.

In its use on automotive vehicles, the safety switch must be sufficiently sensitive to open the circuits in the event of an accident, but at the same time, it must also reliably keep the circuits closed during normal operation, even when the vehicle travels at high speed or upon rough roads. It will be understood that the switch opens the circuit upon displacement or ejection of its mercury pool. When installed upon a vehicle, the switch is subjected to the greatest forces along the line of motion of the vehicle, particularly those developed by sudden stops. Such forces normally have a tendency to displace the mercury and open the circuit.

A further object of the invention therefore, has been to provide a vehicle safety switch having a mercury pool which is displaced or ejected under a predetermined impact force in the direction of vehicle travel, but which is capable of displacement by gravity or by smaller impact force acting transversely to the line of vehicle travel. Accordingly, the pool is not displaced by sudden stops during normal operation but can be displaced only by an impact force acting along the line of travel, such as a head-on collision or similar accident. On the other hand, by reason of the smaller resistance to displacement in the transverse direction, the switch will open under a smaller transverse impact force or will open by gravity without any impact force should the vehicle run into a ditch or otherwise overturn.

Analyzed to its simplest concept, the present structure comprises a switch casing, preferably disc-like in shape having a circular internal cavity delineated by closely spaced vertical wall surfaces and, provided with a mercury cup interposed between the vertical wall surfaces near the central axis of the casing. The cup has an open top and is arranged normally to confine a pool of mercury between the vertical wall surfaces. A pair of switch poles project outwardly from the opposite sides of the casing and have their inner ends in electrical contact with the opposite sides of the mercury pool, such that the circuit is completed through the pool.

The switch is mounted preferably upon the engine, with the flat walls disposed in a plane substantially at right angles to the normal direction of travel and with the cup in upright position confining the mercury. Upon being subjected to an impact of predetermined magnitude along the line of travel, the mercury pool is flattened by momentum acting upon it and flows from the cup upwardly along the vertical wall and into the lower portion of the cavity so as to open the circuit. On the other hand, should the vehicle overturn or roll over, the mercury flows by gravity from the cup and opens the circuit in the same manner.

As explained earlier, the switch is reset by rotating it bodily about its axis, causing the mercury to flow back into the cup. For this purpose, the cavity includes a mercury trap which is arranged to receive the mercury temporarily during rotary movement of the casing, and then to guide the mercury back into the cup as it flows by gravity from the trap. The trap performs the added function of deflecting the mercury away from the cup as it flows upwardly upon impact, as explained later in detail.

The switch poles noted above, are interposed in the main battery circuit which extends from one terminal of the battery to the ground or vehicle chassis. As indicated earlier, an additional switch pole is provided for the generator circuit which is also grounded to the chassis. The third contact preferably passes from the lower portion of the casing upwardly into contact with the lower portion of the mercury pool such that the three poles are in common electrical connection with the mercury pool.

As a vehicle safety device, the switch is furnished for installation upon passenger vehicles and is arranged to accommodate the full electrical load including the starter motor and all accessories. In circuits which carry heavier amperage, such as trucks and semi-trailers, it is contemplated to use the same basic switch but connect two or more of them in parallel to accommodate the heavier load. In this event, the several switches are interposed in the same line normally occupied by the single switch and the operation is identically the same.

Because of the resistance offered by the mercury pool, the maximum amperage or load capacity of the switch is related directly to two variable factors: first the proximity of the contact areas relative to one another, and secondly the area of contact of the poles with the mercury. Otherwise expressed, the resistance is determined by the length and cross section of the mercury pool, and the load capacity increases with an increase in mercury cross section or with a decrease in mercury length.

It has been found by experiment, that if an electrical current of excessive amperage is applied across the main switch poles, the mercury is forcibly ejected from its cup; therefore the switch responds automatically to an overload by opening the circuit. The exact reason for this phenomenon is unknown, but apparently it is brought about by the sudden electrical generation of heat in the pool. Thus, by proper variation of the pole contact area and spacing, the amperage capacity of the switch can be regulated in accordance with the requirements of power circuits, both household and industrial. By way of example, the switch can be made to trip at 15 amperes and be utilized instead of the usual replaceable household fuses. In the event of an overload, the switch is reset conveniently by rotating it, as explained above.

As a mercury switch for general utility in power circuits, the structure is substantially the same as above described and is provided with large pole contact areas closely spaced, forming a short electrical path through a mercury pool, whereby the switch has an exceptionally high amperage capacity in relation to its size.

The conventional mercury switch is used principally for low amperage work because its size and cost increases greatly as amperage requirements increase. However, by utilizing the principles of the present invention, any practical amperage load capacity can be attained simply by regulating the contact areas of the poles without increasing the casing size or quantity of mercury. It will be understood that the mercury trap and third terminal may be omitted when the switch is used in power circuits and that the circuit is opened or closed by rotating the casing as explained earlier.

One of the difficulties of mercury switches in general is the tendency of the mercury to oxidize and interfere with proper functioning. Another feature of the present invention resides in the use of an ionized chemical solution with the mercury to arrest oxidation and maintain the mercury in pure condition.

Various other features and advantages of the invention are more fully disclosed in the following detailed description taken in conjunction with the drawings.

Figure 1:
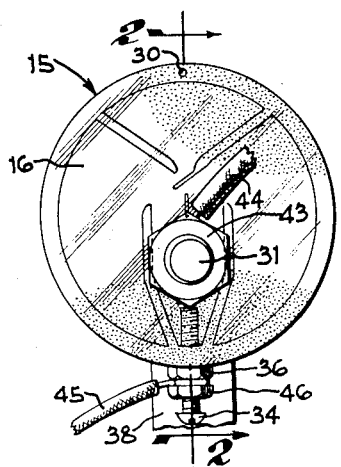
Figure 1 is a face view of the switch in its normal operating position as a safety device or overload circuit breaker.
Figure 2:
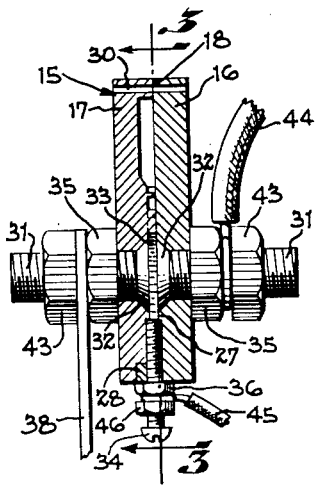
Figure 2 is a sectional view taken on line 2—2, Figure 1, detailing the internal construction of the switch.
Figure 10:
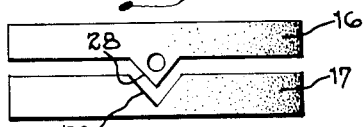
Figure 10 is a bottom view of the switch casing before assembly, showing the spur and notch arrangement for holding the two halves in registry with one another upon being adhesively joined together.

Described with reference to Figure 1, the switch comprises a housing or casing, indicated generally at 15, which is generally circular or disc-like, providing a pair of flat side walls. The housing is formed of a dielectric material and one face or side wall of the housing preferably is transparent as shown in Figure 1, in order that the internal condition of the switch may be observed. In the present disclosure, the housing or casing is formed of thermo-plastic material, which may be of any commercial grade, and consists of two separate sections indicated at 16 and 17 (Figures 2 and 10), which may be most conveniently formed by the ejection molding process. In assembly, the two sections are joined together in face-to-face relationship as shown in Figure 2, the two sections being adhesively bonded together along the interface line, indicated at 18. A liquid adhesive or cement such as acetone or other suitable solvent is used to bond the sections together. It will be understood that the several components of the switch, as explained in detail later, are installed before assembly of the sections.

Figure 3:
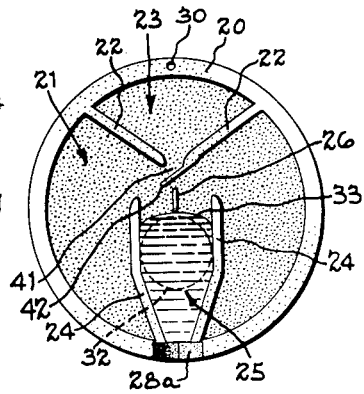
Figure 3 is a sectional view taken on line 3—3, Figure 2, further illustrating the internal arrangement of the switch.

It will be noted in Figures 2 and 3, that casing section 17, which may be called the cavity section, is provided with a peripheral flange or rim 20 which forms the interface 18 when section 16 is placed in mating engagement upon it. Flange 20 spaces the two sections apart and their flat side walls delineate the internal cavity indicated generally at 21, the flange being circular and forming the peripheral wall of the cavity. The cavity section 17 further includes a pair of limbs or ribs 22—22 which are angularly related to one another to form a generally V-shaped mercury trap indicated generally at 23. The outer ends of the ribs are integral with flange 20 and the ribs form an integral part of the cavity section, rising outwardly from the flat internal wall of the cavity.

A second pair of spaced ribs 24—24 are formed upon the flat internal wall of the cavity section 17 and project upwardly from the flange 20, diametrically opposite the ribs 22—22. The lower ends of the ribs are joined to the peripheral wall and in assembly the ribs form a generally U-shaped mercury cup indicated at 25.

It will be understood that the several ribs and flange form an integral part of the cavity section 17, such that it is molded in complete form in one operation, while section 16 consists of a flat disk. The outer surfaces of the ribs 22 and 24 are flush with the outer surface of flanges 20, and upon assembly, the adhesive is applied to the ribs and to the flange. The required quantity of mercury is then poured into the cavity section 17 and the section 16 is applied. This completes the formation of the V-shaped mercury trap and mercury cup or receptacle, the ribs being interposed between the spaced internal wall surfaces and joined to them. It will be noted that the cavity further includes a baffle 26 which extends across the open top of the mercury cup between the ribs 24—24.

As best shown in Figure 2, the internal cavity is provided with a zone of reduced thickness in its lower portion, as indicated at 27, the remainder of the cavity being substantially greater in width. The zone 27 delineates the sides of the mercury pool and provides a relatively thin mercury layer between the contact areas of the switch poles as shown in Figures 2.

In the present embodiment of the invention, the cavity section 17 is formed of an opaque thermoplastic material and section 16 is formed of a transparent material. It will be noted in Figures 2 and 10, that section 16 includes a spur 28 projecting from its inner face and adapted to mate with a complementary notch 28a formed in section 17. Diametrically opposite spur 28, the two sections are provided with matching holes 30 adapted to receive an alignment pin at assembly. These holes in combination with the spur and notch, hold the two sections accurately in concentric relationship as they are bonded together. After assembly, the alignment pin is removed and the switch is ready for operation.

It will be understood that the bonded joint between the two sections permanently seals the internal cavity of the switch and prevents leakage of mercury. The thermoplastic material itself has a high degree of physical strength and the switch assembly is capable of withstanding rough usage without danger of breakage or failure.

The battery circuit is completed through the mercury switch by way of the switch poles or terminals 31—31 which project outwardly from the opposite side walls of the casing. As explained earlier, the electrical resistance of the mercury pool is governed by the cross section and length of the pool. Thus the amperage or electrical load rating is determined by the areas of the poles and the proximity or spacing of the pole areas which are in mercury contact on opposite sides of the pool.

In the present embodiment, the poles 31—31 are provided with enlarged mercury contact heads 32—32 which are countersunk in the sections 16 and 17, with their surfaces flush with the internal surfaces of the cavity walls. Referring to Figure 3, it will be noted that the poles are aligned with one another along an axis which passes through the mercury cup such that the mercury pool 33 is in contact with both contact heads 32 to complete the electrical circuit across the contact areas from one to the other. As explained earlier, the reduced width zone 27 of the cavity forms the sides of the mercury cup and thus reduces the mercury pool to a desired minimum thickness. It will be observed in Figure 2, that the enlarged contact heads and their close proximity provides a short electrical path through the mercury which has a substantial cross section for high amperage. This is desirable in that the switch is arranged to carry the full amperage of the automotive circuit including the starter motor as shown in the electrical diagram. In actual practice, contact ends having a diameter of approximately ½ inch, spaced apart ⅛ of an inch or less, are utilized. This ratio of area and spacing is found to carry the full load (500 or more amperes, depending upon exact spacing) without failure. On the other hand, experiment has shown that if one or both of these factors are changed substantially to increase the resistance (by decreasing contact area or increasing the spacing), then the mercury in the cup is forcibly expelled when the full electrical load is applied across the switch poles. Therefore, when used as an overload circuit breaker, the contact ends of the poles have a correlated area and spacing which provides an electrical path therough the mercury which has an electrical load limit equal to the maximum load to be carried by the circuit. When this load is exceeded, the mercury is expelled from the cup to open the circuit.

In addition to the main switch poles 31—31, the switch is provided with a third pole or terminal 34 which serves the ignition system as explained later. Pole 34 consists of a machine screw having an end threaded through the spur 28 and extending upwardly into the mercury pool. This arrangement provides a substantial area in contact with the mercury for minimum electrical resistance.

Upon assembly of the switch, the two main poles are passed through the housing sections as shown in Figure 2 and are clamped in position by means of the lock nuts 35—35 which are tightened to draw the contact heads firmly into their countersunk sockets. The pole terminal 34 is then threaded through the spur 28 and is clamped in position by the lock nut 36. When the mercury is poured into the section 17, a small quantity of ionized chemical solution, for example, a ten percent solution of glacial acetic acid, is added. It has been discovered that the liquid solution is effective to arrest oxidation and keep the mercury free of impurities for maximum electrical conductivity.

When the housing is ready for assembly, the liquid adhesive is applied to the surfaces of the flange and ribs as previously described, the alignment pin is inserted through the matching holes 30 and the two sections are then clamped firmly together until the adhesive bond is set. The switch is then complete and ready for installation.

Figure 8:
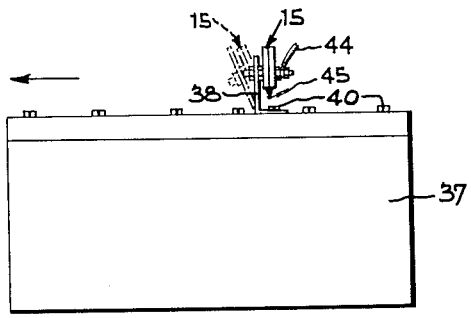
Figure 8 is a diagrammatic view of an engine block illustrating the preferred mounting arrangement for the switch when applied to a vehicle.

As shown in Figures 2 and 8, the switch preferably is mounted upon the motor block 37 by means of a metal angle bracket 38 which may be clamped in position by one of the cylinder head nuts 40. Since the engine block is grounded to the chassis or frame of the vehicle, the metal bracket 38 completes one side of the battery circuit to the switch. The electrical circuit, with reference to the safety switch is explained in detail later in conjunction with the diagram of Figure 9. It will be understood at this point, that the switch is effective to open the ground or negative side of the electrical circuit upon being tripped.

Figure 4:
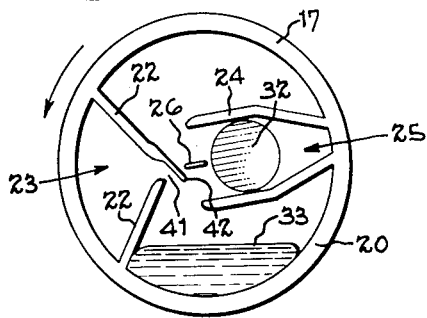
Figure 4 is a diagrammatic view illustrating the switch rotated to a tilted position with the circuit open.
Figure 7:
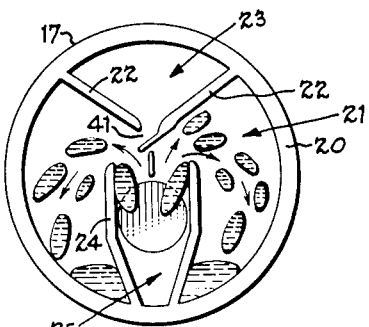
Figure 7 is a diagrammatic view showing the switch in the position of Figure 3 by showing the flow of ejected mercury when the switch is subjected to a sudden impact in the line of travel, such as a head-on collision. The view also shows the ejection of mercury by electrical energy when the device is utilized as an overload switch.

As explained earlier, if the vehicle upsets, the mercury will flow from its cup by gravity as shown in Figure 4, and in the event of a head-on collision, the mercury is forced by momentum force upwardly along the wall of the cavity as indicated in Figure 7. In order to provide greater sensitivity, the bracket may be inclined forwardly in the direction of motion of the vehicle as indicated in broken lines in Figure 8. This inclines the forward wall of the cavity forwardly and provides a flow surface which reduces the impact velocity necessary to trip the switch.

As explained earlier, the ribs 22 which form the V-shaped mercury trap, have their lower ends spaced apart to provide a drainage opening 41 at the apex of the V, immediately above the open top of the mercury cup. When the mercury is displaced by impact, as shown in Figure 7, the lower surfaces of the ribs 22, by virtue of their V relationship, act as deflectors as indicated by the arrows, causing the mercury to flow radially in opposite directions away from the opposite sides of the mercury cup. This prevents any of the mercury from dropping back into the cup and insures a complete break of the circuit across the main terminals and third terminal.

Figure 5:
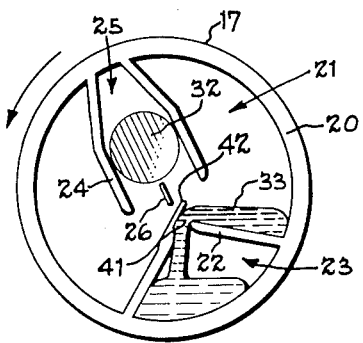
Figures 5 and 6 are diagrammatic views showing the flow of mercury as the switch is rotated about its axis during the resetting operation.
Figure 6:
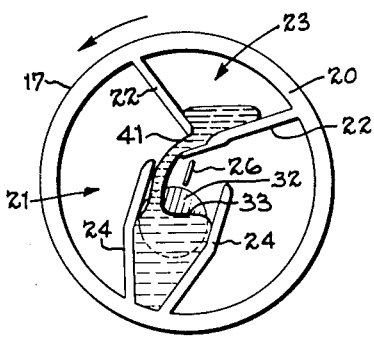

In order to reset the switch, it is rotated in the counterclockwise direction as indicated by the arrows in Figures 4 to 6. As shown in Figure 5, one of the ribs 22 projects downwardly beyond the plane of the adjacent rib as indicated at 42. The extended end of the rib provides a dam adjacent the opening 41, causing the free mercury, which flows by gravity down the rib 22, to be directed through the opening 41 into the V-shaped trap. Continued rotation of the switch in the same direction causes the mercury to flow downwardly from the trap through opening 41 back into the mercury cup as shown in Figure 6, thus placing the switch in condition for use.

The baffle 26, which extends across the top of the mercury cup prevents loss of mercury from the cup under shocks and vibrations which occur during normal operation of the vehicle. This baffle has a stabilizing influence upon the mercury in the upper portion of the pool under normal shocks, particularly those which are transverse to the line of travel, and deflects back into the cup any small quantities of mercury which might otherwise spill out.

The installation of the switch upon a vehicle is a simple matter; the bracket 38 is bolted to the engine block, then the pole of the switch is inserted through a hole in the upper end of the bracket and is clamped in position by the nut 43. The battery cable 44 is then connected to the opposite pole and is clamped in position by means of a second nut 43. It will be understood at this point, that the battery cable 44 is normally connected or grounded to the frame of the vehicle and upon installation of the switch, is disconnected from the frame and instead, is connected to the pole of the switch. Thus the ground circuit is completed from the battery terminal by way of the mercury pool and bracket 38 to the grounded engine block. As explained in detail with reference to the electrical diagram, a cable 45 is also connected to the third pole 34 and clamped to it by a nut 46.

Figure 9:
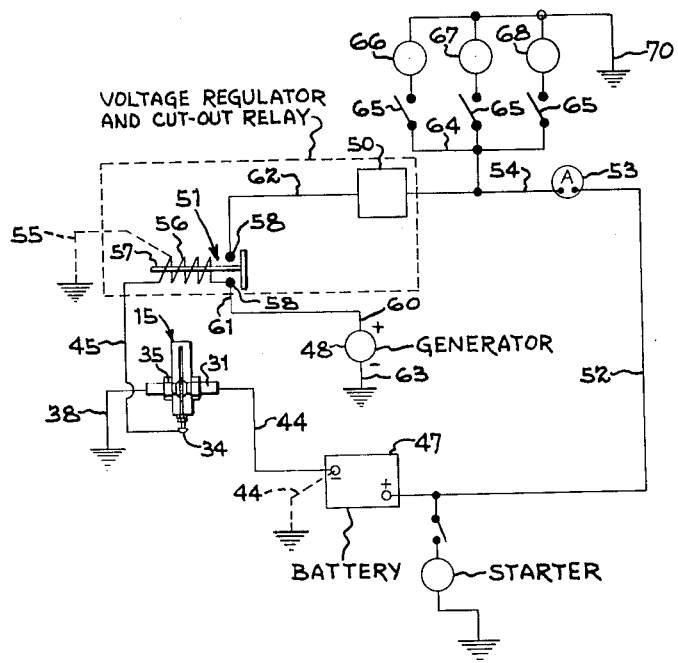
Figure 9 is a simplified diagram of a typical automobile electrical system, showing the electrical connections to the safety switch.

The electric circuit disclosed in Figure 9 illustrates in simplified form a typical automotive electrical circuit embodying the safety switch. For the sake of simplicity, the electrical components of the system are shown in block form and are limited in number; however, it will be understood, that in an actual circuit, all of the components are acted upon by the safety switch.

The electrical system includes the usual storage battery indicated at 47, generator 48, and a conventional voltage regulator 50 of the type which regulates the supply of current applied by the generator to the storage battery. The circuit also includes a cut-out relay indicated generally at 51, which is adapted to disconnect the generator from the battery when the amount of current being generated falls below a predetermined value. The purpose of the cut-out relay is to prevent the battery from discharging through the generator when the engine is not running. The cut-out relay usually forms a part of the voltage regulator but is shown separately in the diagram.

To provide convenient installation, the safety switch is adapted to be incorporated in the electric system with practically no changes in the original circuit. For a better understanding of the circuit disclosed in Figure 9, the conventional arrangement is indicated by the broken lines as explained hereafter, and it will be understood that these portions are omitted when the safety switch is installed.

One side of the battery circuit, usually the negative side, is completed through the vehicle frame, as indicated by the broken line 44. This line consists of the battery cable noted earlier, which normally has its end connected to the vehicle frame and which is now connected to the pole 31 of the switch by the solid line 44. The positive terminal of the battery is connected by way of line 52 through the ammeter 53 and by way of line 54 to the voltage regulator 50. Under ordinary circumstances, the opposite negative side of the voltage regulator is grounded as indicated by broken line 55. However, in adapting the circuit to the safety switch, the ground connection 55 is omitted and instead the ground side of the voltage regulator is connected by way of line 45 through the cut-out relay, to the third terminal 34 of the safety switch.

The purpose of the third terminal 34 is to deenergize the cut-out relay and thus indirectly open the generator circuit in case of collision or other accident. In order to illustrate this, a simple relay is shown, having a coil 56, an armature 57 and contacts 58. Under normal conditions, the generator circuit is completed by way of line 60 from the positive generator terminal, through coil 56 to ground line 55. With the safety switch in the circuit it will be seen that the relay coil is grounded by way of line 45.

When sufficient current is being generated, contacts 58 are closed by the magnetic flux generated by coil 56. This completes a charging circuit through line 60, branch line 61, contacts 58, line 62, through the voltage regulator and ammeter to the positive battery terminal. The negative side of the generator is grounded as at 63 and this circuit is thus completed through the bracket 38 and mercury pool to the negative battery terminal.

The circuit is completed to the various components of the vehicle from line 54 to branch line 64, which is connected in common through a series of switches 65 to the ignition system 66, lighting system 67, heater motor 68 and other accessories of the vehicle which are not shown. These individual circuits are not detailed since their exact construction and operation is not pertinent to the present invention. The negative side of the circuit to these components is completed by the ground line 70 which is common to all of them.

Safety switches in the past, so far as is known, have been interposed in the line 44 as in the present disclosure, so as to interrupt the negative circuit of the battery in the event of a collision or upset. It will be understood that this arrangement will disconnect the negative battery terminal from the chassis or frame and thus interrupt the negative battery circuit to the various electrical systems which are grounded to it. However, assuming that the engine is running and the generator charging, with the cut-out relay closed, the generator will continue to energize the ignition system and other electrical parts as explained above, even though the negative battery circuit is opened by the switch. Thus the conventional safety switch is positively effective only in the event that the engine is stopped at the time of the collision or as a consequence of it.

By virtue of the third pole 34, the present safety switch opens both the battery and generator circuits in the event of a crash, whether the engine is running or not. Referring to Figure 9, it will be obvious that the negative side of the battery circuit (line 44) will open when the safety switch is tripped. Since the ground circuit (line 45) of the cut-out relay is also grounded through the switch, it follows that the relay will also open when the switch is tripped. As soon as the relay opens, the circuit from the generator circuit to the ignition system is interrupted and the engine stops. In summary therefore, in the event of an accident, the negative battery circuit is opened through the main poles 31—31 and the generator circuit is opened by way of the third switch pole 34, such that the engine is stopped due to ignition failure and all other electrical parts are deenergized.

As explained earlier, it is intended to apply the principles of the present switch to overload circuit breakers for general utility. As such, the unit will follow the construction disclosed herein except that the amperage limits are determined by reducing or increasing the contact areas depending upon the amperage requirements.

Figure 11:
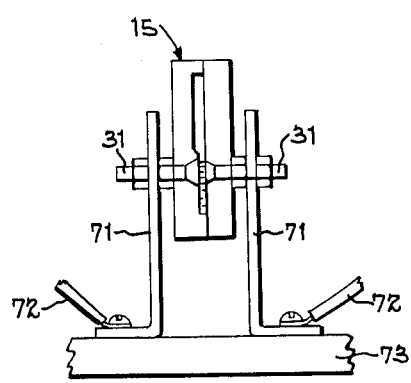
Figure 11 is a diagrammatic view showing the switch mounted as a circuit breaker to protect a power circuit against overloads.

As a circuit breaker for overload protection, the switch may be rotatably mounted upon spaced brackets 71 as indicated diagrammatically in Figure 11. These brackets may engage the contact poles 31—31 and the electrical connections may be made directly through the brackets as indicated at 72. The brackets are mounted upon an insulating block 73 such that the circuit is completed through the poles and mercury pool. It will be noted that the poles 31 are reduced in size so as to reduce the amperage rating and that the third pole 34 may be omitted. Upon being tripped, the switch is conveniently reset by rotating it relative to the brackets as explained earlier.

In the present disclosure, the terminals or poles 31 and 34 are fabricated from steel and are found to operate in a highly satisfactory manned since the electrical resistance of steel is considerably less than mercury. However, as explained later, it is also contemplated to fabricate the terminals from brass and other metals having greater conductivity, with a flash chrome plating to prevent amalgamation.

As outlined earlier, the amperage or load capacity of a mercury switch is related directly to the length and cross-section of its mercury pool. So far as is known, commercial general utility mercury switches in the past have utilized an envelope, usually of glass, having a mercury cavity and having switch poles fused directly in the wall of the envelope and extending into electrical contact with the pool. The conventional envelope has been of glass because it has been necessary to evacuate the envelope and hermetically seal it, as explained later. Because of the difference in thermo-expansion between the wall of the glass envelope and the metal switch pole, the selection of metal is limited to conductors, such as stainless steel, which have higher electrical resistance than brass or copper. Moreover, the physical limitations imposed by the glass-to-metal seal requires that the cross-section of the pole be kept small, thus limiting the capacity of the switch to a low value, usually in the neighborhood of a few amperes. Attempts have been made to increase the amperage rating of such switches by increasing the overall dimensions of the casing and poles; however such attempts have been impractical because of increased size and cost of materials.

According to the present invention, the switch poles can be made of a good metallic conductor such as copper, brass or silver, since the poles need not be fused into the envelope but instead are simply clamped in by means of nuts; on the other hand, the poles may, if desired, be fused in the plastic side walls.

As explained earlier, the electrical resistance of the mercury is greater than the resistance of the metallic switch poles and for this reason, the contact area of the poles with respect to the mercury, for a given amperage, is determined according to the particular material of the poles. It will be understood therefore, that the switch can be made to carry any practical current load or amperage simply by increasing the contact area of the poles, bearing in mind that the poles are in close proximity to one another to provide the shortest possible electrical path through the mercury pool.

Briefly therefore, the load capacity of the conventional mercury switch is limited by the necessary slenderness of its glass fused poles; however, by following the principles of the present invention, the contact areas can be increased in a practical and inexpensive manner to provide any necessary load capacity.

As indicated earlier, the conventional mercury switches utilize either an evacuated envelope or one which is filled with an inert gas, since mercury oxidizes very rapidly in the presence of air. In order to provide hermetic sealing for the exclusion of air or confinement of gas, the conventional switch, as indicated above, has required the use of an envelope which is formed of glass.

It has been discovered that the oxidation of mercury may be completely arrested by adding to the cavity a small quantity of a liquid solution which reacts chemically with the mercury to arrest oxidation. This makes possible the use of the present two-piece switch casing of plastic material which is liquid sealing but because of the liquid solution, need not be hermetically sealed. Specifically, a rather weak solution containing an acid or base that will not effect the metal poles, for example acetic acid, has been found practical.

Experiment indicates that a ten percent solution of glacial acetic acid is effective to arrest oxidation and maintain the mercury in a pure condition, with a bright clear surface which readily conducts the current. Although the exact effect of the solution is unknown, it is believed that the solution, whether acid or base, must produce two essential functions; first it must have the power of reducing the oxidized mercury to its original pure state and of preventing further oxidation; secondly it must be an electrically conducive solution suitable to complete, at least temporarily, the electrical path from the contact area to the mercury pool.

In summary therefore, the action of the solution makes possible the use of the present combination of a plastic casing having poles which will carry any given amount of amperage by virtue of the pole material, area and proximity. Thus by virtue of the present switch casing made possible by the use of the solution the required amount of mercury, as well as overall cost of the switch unit, is far less than the cost of a conventional mercury switch of equal amperage capacity. In other words, a relatively small switch casing can be made to produce practically any desired amperage rating by utilizing a casing and pole combination as disclosed.

It will be observed that the same principles of the invention are utilized whether the switch is used as an automotive safety switch, overload circuit breaker or control switch except that the contact areas of the poles are varied to suit the required service. It will also be understood that the ionized solution is utilized with the mercury regardless of the use to which the switch is to be applied.

Having described my invention I claim:

1. A safety switch adapted to be mounted in an automotive vehicle and inserted in the electrical circuit thereof, the switch adapted to open the circuit in response to an impact in the line of vehicle travel or upon overturning of the vehicle, said switch comprising, a switch casing formed of dielectric material having an internal cavity, said cavity being delineated by a pair of spaced, relatively flat side walls, said walls being disposed in a generally vertical plane when the switch casing is mounted in an upright position in a vehicle, said cavity having a peripheral wall joining said spaced side walls, a generally U-shaped mercury cup interposed between said spaced side walls within said cavity, a pool of mercury normally confined within said mercury cup, the cup adapted to discharge the pool of mercury when the switch casing is partially rotated about its axis in said generally vertical plane or subjected to an impact in said line of travel, the cavity being adapted to receive the mercury discharged from the mercury cup, a pair of metallic switch poles projecting through said spaced side walls, said poles being disposed along a generally horizontal axis which passes through said mercury cup, said poles having internal contact areas spaced apart from one another and in contact with said mercury pool at opposite sides, and a mercury trap mounted within the internal cavity and disposed above the mercury cup, said trap comprising a pair of ribs having their upper ends joined to the peripheral wall of the cavity and extending downwardly in inclined planes toward one another, the lower end of one of said ribs terminating short of the other rib and providing an opening, the other rib projecting downwardly beyond the adjoining rib towards the mercury cup and delineating one side of said opening, said projecting rib forming a baffle adapted to guide the mercury into said trap upon manual rotation of the casing, said trap adapted to receive the mercury and discharge the same into said cup upon rotation of the casing to said upright position to close the switch after the same has opened said circuit upon impact or overturn of the vehicle.

2. A safety switch adapted to be mounted in an automotive vehicle and inserted in the electrical circuit thereof, the switch adapted to open the circuit in response to an impact in the line of vehicle travel or upon overturning of the vehicle, said switch comprising a switch casing formed of dielectric material having an internal cavity, said cavity being delineated by a pair of spaced, relatively flat side walls, said walls being disposed in a generally vertical plane when the switch casing is mounted in an upright position in a vehicle, said cavity having a peripheral wall joining said spaced side walls, a generally U-shaped mercury cup interposed between said spaced side walls within said cavity, a pool of mercury normally confined within said mercury cup, the cup adapted to discharge the pool of mercury when the switch casing is partially rotated about its axis in said generally vertical plane or subjected to an impact in said line of travel, the cavity being adapted to receive the mercury discharged from the mercury cup, a pair of metallic switch poles projecting through said spaced side walls, said poles being disposed along a generally a horizontal axis which passes through said mercury cup, said poles having internal contact areas spaced apart from one another and in contact with said mercury pool at opposite sides, and a mercury trap mounted within the internal cavity and disposed above the mercury cup, said trap being generally V-shaped in the plane of the side walls, said mercury trap having an opening at the lower apex thereof which is disposed above said cup and adapted to provide a passageway adapting the mercury to flow into said trap when the casing is rotated about its axis in said vertical plane, said opening adapted to direct the mercury downwardly into the cup upon rotation of the casing to said upright position to close the switch after the same has opened said circuit in response to an impact or overturn of the vehicle.

3. A safety switch adapted to be mounted in an automotive vehicle and inserted in the electrical circuit thereof, the switch adapted to open the circuit in response to an impact in the line of vehicle travel or upon overturning of the vehicle, said switch comprising a switch casing formed of dielectric material having an internal cavity, said cavity being delineated by a pair of spaced, relatively flat side walls, said walls being disposed in a generally vertical plane when the switch casing is mounted in an upright position in a vehicle, said cavity having a peripheral wall joining said spaced side walls, a generally U-shaped mercury cup interposed between said spaced side walls within said cavity a pool of mercury normally confined within said mercury cup, the cup adapted to discharge the pool of mercury when the switch casing is partially rotated about its axis in said generally vertical plane or subjected to an impact in said line of travel, the cavity being adapted to receive the mercury discharged from the mercury cup, a pair of metallic switch poles projecting through said spaced side walls, said poles being disposed along a generally horizontal axis which passes through said mercury cup, said poles having internal contact areas spaced apart from one another and in contact with said mercury pool at opposite sides, and a mercury trap mounted within the internal cavity and disposed above the mercury cup, said trap being generally V-shaped in the plane of the side walls, said mercury trap having an opening at the lower apex thereof which is disposed above said cup and adapted to provide a passageway adapting the mercury to flow into said trap when the casing is rotated about its axis in said vertical plane, said opening adapted to direct the mercury downwardly into the cup upon rotation of the casing to said upright position to close the switch after the same has opened said circuit in response to an impact or overturn of the vehicle, said V-shaped trap providing a pair of baffle surfaces disposed above the mercury cup, said baffle surfaces diverging outwardly in opposite directions and adapted to deflect the mercury outwardly beyond the opposite sides of the cup in response to an impact in the line of travel.

4. A safety switch adapted to be mounted in an automotive vehicle and inserted in the electrical circuit thereof, the switch adapted to open the circuit in response to an impact in the line of vehicle travel or upon overturning of the vehicle, said switch comprising, a switch casing having an internal cavity, said cavity having a pair of spaced, generally vertical side walls and having a peripheral wall joining said spaced side walls, a pair of spaced limbs rising upwardly from said peripheral wall and having their lower ends joined to said peripheral wall, said limbs having their opposite sides joined to said spaced walls and thereby providing a generally U-shaped receptacle having an open top, said receptacle having a volumetric capacity which is less than the volumetric capacity of said cavity, a pair of metallic switch poles projecting through said side walls from opposite sides of the casing, said poles being disposed along a generally horizontal axis which passes through said receptacle, said switch poles having internal contact ends disposed within said receptacle and spaced apart from one another and a pool of electrical conducting liquid normally confined within the receptacle whereby the electrical circuit is completed through said pool by said spaced switch poles, said pool of electrical conducting liquid adapted to be discharged from the receptacle in response to an impact or overturn of the vehicle, thereby opening said electrical circuit.

5. An overload circuit breaker for an electrical circuit comprising, a switch casing having an internal cavity, said cavity having a pair of spaced, generally vertical side walls and having a peripheral wall joining said spaced side walls, a pair of spaced limbs rising upwardly from said peripheral wall and having their lower ends joined to said peripheral wall, said limbs having their opposite sides joined to said spaced walls and thereby providing a generally U-shaped receptacle having an open top, said receptacle having a volumetric capacity which is less than the volumetric capacity of said cavity, a pair of metallic switch poles to be inserted in the circuit, the switch poles projecting through said side walls from opposite sides of the casing, said poles being disposed along a generally horizontal axis which passes through said receptacle, said switch poles having internal contact ends disposed within said receptacle and spaced apart from one another, and a pool of liquid mercury normally confined within the receptacle, whereby the electrical circuit is completed through said pool by said spaced contact ends, the contact ends having a correlated area and spacing which provides an electrical path through said mercury having an electrical load limit equal to the maximum load to be carried by the circuit, said pool of electrical conducting liquid being ejected from the receptacle upon passage therethrough of an electrical current greater than said load limit, thereby to open the circuit.

6. A safety switch adapted to be mounted in an automotive vehicle and inserted in the electrical circuit thereof to open the circuit in response to an impact in the line of vehicle travel, or upon overturning of the vehicle, said switch comprising, a switch casing having an internal cavity delineated by a pair of spaced, generally vertical side walls and a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through the spaced side walls from opposite sides of the casing along a generally horizontal axis which passes through said receptacle, said switch poles having spaced internal contact ends disposed within the receptacle, said internal contact ends being substantially flush with the spaced side walls of the cavity, and a pool of liquid mercury confined within the receptacle, whereby the electrical circuit is completed through said pool by the said spaced contact ends, said pool or mercury being discharged from the receptacle in response to an impact acting along a line generally at right angles to the side walls of the casing, the mercury pool being flattened under the force of said impact and thereby flowing upwardly along the vertical side wall and from the open top of the receptacle into the cavity to open the circuit across the switch poles.

7. A safety switch adapted to be mounted in an automotive vehicle and inserted in the electrical circuit thereof to open the circuit in response to an impact in the line of vehicle travel, or upon overturning of the vehicle, said switch comprising, a switch casing having an internal cavity delineated by a pair of spaced, generally vertical side walls and a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through the spaced side walls from opposite sides of the casing along a generally horizontal axis which passes through said receptacle, said switch poles having spaced internal contact ends disposed within the receptacle, said spaced contact ends being substantially flush with the spaced side walls of the cavity, a pool of liquid mercury confined within the receptacle, whereby the electrical circuit is completed through said pool the said spaced contact ends, said pool of mercury being discharged from the receptacle in response to an impact along a line transverse to the side walls of the casing, the mercury pool being flattened under the force of said impact and thereby flowing upwardly along the vertical side wall for discharge from the open top of the receptacle to open the circuit across the switch poles, and a second pair of spaced elements converging downwardly toward one another, and delineating a mercury trap having a delivery opening disposed above the open top of the receptacle, said converging elements deflecting the mercury laterally toward the cavity upon discharge from the open top of the receptacle under said impact force, said mercury trap collecting the mercury from the cavity and discharging the mercury through the said delivery opening into the open top of the receptacle upon bodily rotation of the switch casing about a generally horizontal axis which is transverse to the side walls of the casing.

8. An overload circuit breaker for an electrical circuit comprising, a switch casing having an internal cavity, said casing having a pair of spaced, generally vertical side walls and having a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through said side walls from opposite sides of the casing, said poles disposed along a generally horizontal axis which passes through said receptacle, said poles having spaced internal contact ends disposed within said receptacle, said spaced contact ends being substantially flush with the spaced side walls of the casing, and a pool of liquid mercury normally confined within the mercury receptacle, the electrical circuit being completed through said pool by said spaced contact ends, the contact ends having a diameter which is greater than the spacing of the side walls and flush contact ends, the said diameter and spacing providing an electrical path through the mercury having an electrical load limit equal to the maximum load to be carried by the circuit, said pool of mercury being expelled from the receptacle upon passage through the mercury of an electrical current greater than said load limit, thereby to open the circuit across the switch poles.

9. An overload circuit breaker for an electrical circuit comprising, a switch casing having an internal cavity, said casing having a pair of spaced, generally vertical side walls and having a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through said side walls from opposite sides of the casing, said poles disposed along a generally horizontal axis which passes through said receptacle, said poles having internal contact ends disposed within said receptacle and spaced apart from one another, said spaced contact ends being substantially flush with the spaced side walls of the casing, a pool of liquid mercury normally confined within the receptacle, the electrical circuit being completed through said pool by said spaced contact ends, the contact ends having a diameter which is greater than the spacing of the side walls and contact ends, the said diameter and spacing providing an electrical path through the mercury having an electrical load limit equal to the maximum load to be carried by the circuit, said pool of mercury being expelled from the receptacle upon passage through the mercury of an electrical current greater than said load limit, thereby to open the circuit across the switch poles, and, a second pair of spaced elements converging downwardly toward one another and delineating a mercury trap having a delivery opening disposed above the open top of the receptacle, said converging elements deflecting the mercury laterally toward the cavity upon being expelled from the open top of the receptacle, said mercury trap collecting the mercury from the cavity and discharging the mercury through the said delivery opening into the open top of the receptacle upon bodily rotation of the switch casing about a generally horizontal axis which is transverse to the side walls of the casing.

10. An overload circuit breaker for an electrical circuit comprising, a switch casing having an internal cavity, said casing having a pair of spaced, generally vertical side walls and having a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through said side walls from opposite sides of the casing, said poles disposed along a generally horizontal axis which passes through said receptacle, said poles having spaced internal contact ends disposed within said receptacle, said spaced contact ends being substantially flush with the spaced side walls of the casing, and a pool of liquid mercury normally confined within the mercury receptacle, the electrical circuit being completed through said pool by said spaced contact ends, the diameter of the contact ends being greater than the spacing thereof, the related area and proximity of the contact ends creating an electrical path having a current capacity equal to the maximum load to be carried by the circuit, said pool of mercury being expelled from the receptacle upon passage through the mercury of an electrical current greater than said load limit, thereby to open the circuit across the switch poles.

11. A safety switch adapted to be mounted in an automotive vehicle and inserted in the electrical circuit thereof to open the circuit in response to an impact in the line of vehicle travel, or upon overturning of the vehicle, said switch comprising, a switch casing having an internal cavity delineated by a pair of spaced, generally vertical side walls and a peripheral wall joining said spaced side walls, a pair of spaced elements rising upwardly from said peripheral wall and providing a mercury receptacle having an open top, said receptacle having a volumetric capacity which is less than the volumetric capacity of said internal cavity, a pair of metallic switch poles projecting through the spaced side walls from opposite sides of the casing along a generally horizontal axis which passes through said receptacle, said switch poles having spaced internal contact ends disposed within the receptacle, and a pool of liquid mercury confined within the receptacle, whereby the electrical circuit is completed through said pool by the said spaced contact ends, the diameter of the spaced contact ends being greater than the spacing thereof, the related area and proximity of the contact ends creating an electrical path having a current capacity greater than the maximum electrical load of the circuit, said pool of mercury being discharged from the receptacle in response to an impact acting along a line generally at right angles to the side walls of the casing to open said circuit.

References Cited in the file of this patent

UNITED STATES PATENTS

| | | |
|---|---|---|
| 2,079,462 | McHugh | May 4, 1937 |
| 2,251,316 | Bear et al. | Aug. 5, 1941 |
| 2,509,514 | Matthews et al. | May 30, 1950 |
| 2,642,512 | Shamah | June 16, 1953 |